J. BILLINGS.
IDENTIFICATION MEANS FOR AUTOMOBILES.
APPLICATION FILED MAR. 31, 1920.

1,364,025. Patented Dec. 28, 1920.

WITNESSES
Frank J. Faggiani
J. L. McAuliffe

INVENTOR
JOSEPH BILLINGS,
BY Munn & Co
ATTORNEYS

UNITED STATES PATENT OFFICE.

JOSEPH BILLINGS, OF BROOKLYN, NEW YORK.

IDENTIFICATION MEANS FOR AUTOMOBILES.

1,364,025. Specification of Letters Patent. Patented Dec. 28, 1920.

Application filed March 31, 1920. Serial No. 370,250.

*To all whom it may concern:*

Be it known that I, JOSEPH BILLINGS, a citizen of the United States, and a resident of the city of New York, borough of Brooklyn, in the county of Kings and State of New York, have invented new and Improved Identification Means for Automobiles, of which the following is a description.

My invention relates to means for identifying a machine and more particularly is intended for embodiment in automobiles, having especially in view the possibility of their being stolen.

The invention has for its general object to reverse the present conditions where the advantages in the matter of location and identification of a stolen automobile are with the thief and his confederates rather than with the owner and his legal representatives. The effort to identify and recover stolen automobiles meets with such little success that approximately but 3% of these are recovered, while approximately 97% remain unrecovered, notwithstanding the systematic and organized effort of the individual owners and insurance companies.

The objects of the invention include the purpose of providing a mode of automobile identification lending itself to the activities of automobile insurance companies that the company may incorporate in an automobile its own approved factors of identification and in a manner that its agents may be equipped for the prompt and unfailing identification of a given automobile, for example, among a large number requiring to be examined and identified in the very limited period of time frequently available under present conditions that work adversely to those charged with the attempted identification.

It is recognized that factoring in the success of organized thievery of automobiles is the facility and promptness with which the skilful and cunning confederates of the thieves can alter or obliterate the usual means relied upon for identification such as the factory number of the automobile for example; the step of procuring a new license for the changed automobile being another expedient factoring in making safe the theft.

For a full understanding and appreciation of the present invention a knowledge and recognition of existing conditions are important, for which reason the following facts are here given: It is suspected and indeed largely believed that an important agency facilitating the disposal of a stolen automobile and accounting for its complete disappearance, is the actual conditions attending the boxing and shipping of automobiles to foreign destinations. For example, it is not unusual for a single boxing and shipping institution to have brought in to it in a single day for boxing and shipping abroad from one to two hundred automobiles of a given make and all these with the numerous automobiles of other makes thus received may be boxed and ready for shipping within twenty-four hours after their receipt by the boxing people. It is therefore to be presumed that the stated circumstances are availed of by organized thievery and in this connection it will be obvious that the police, as well as the agents of the owners and of the insurance companies are vitally handicapped by the absence from the stolen cars of the usual marks of identification obliterated by the thieves, and by the physical impossibility of making a general and critical examination of the individual automobiles in the limited time before their boxing and shipping.

I have in view to provide an identification means by the use of which I take from the owner and his legal representatives the important handicap referred to now operating against them and place the same on those engineering the thievery by requiring for the reasonably safe accomplishment of the theft that the automobile be completely gone over and critically examined as regards all removable or separable elements thereof before the thieves can feel a degree of surety that the identification means has been located in its entirety.

To the end that the thieves be thus handicapped, the invention contemplates the embodiment of identification means in an element or elements corresponding with other elements and so arranged as to disguise the identification character thereof, the other like elements in any group or given total number of elements, selected for the purpose of carrying out the invention, thus constituting in effect a camouflage for the identifying elements and materially aiding in the masking thereof.

Also, I provide for carrying out the invention in such a manner that under circumstances, where the element of time may be governing, a very large number of automobiles in a given situation may, with the required despatch, receive the necessary examination for the possible identification by the means incorporated in particular automobiles in accordance with my invention.

Again, I have in view to make possible the carrying out of the invention in a manner insuring the preservation of the identification means and the embodying of the same in a form making potentially for indisputable evidence of the identification and available as such.

Reference is to be had to the accompanying drawing forming a part of this specification, it being understood that the drawing is merely illustrative of one example of the invention.

Figure 1:
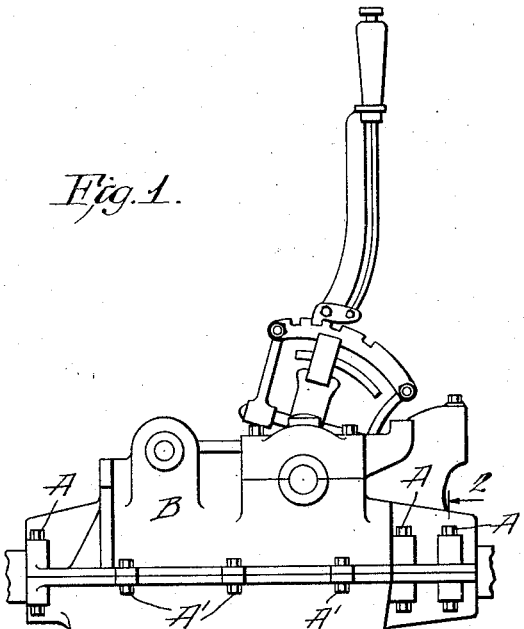
Figure 1 is a side elevation of the transmission case of an automobile of known make, having a plurality of bolts that may be made to enter into the carrying out of my invention.
Figure 2:
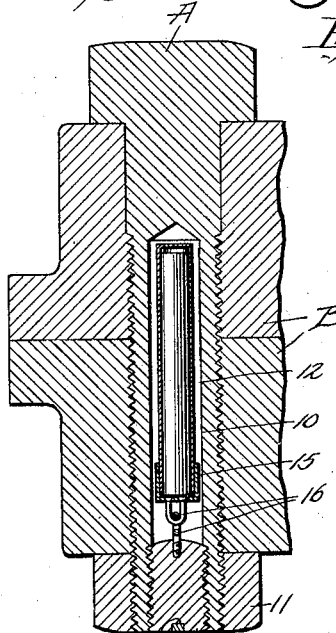
Fig. 2 is a greatly enlarged detail in vertical section of a bolt having my invention embodied therein and certain flange members clamped by said bolt, the section being indicated by the line 2—2, Fig. 1.
Figure 3:
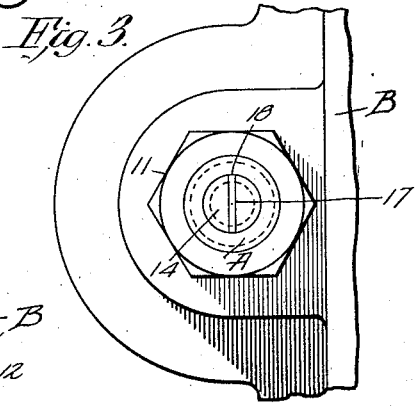
Fig. 3 is a plan view of the features shown in Fig. 2.
Figure 4:
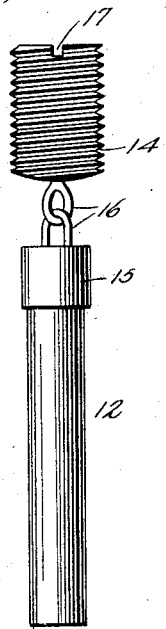
Fig. 4 is a side elevation of a container for an identification card and a plug to constitute a closure of the pocket in the bolt.
Figure 5:
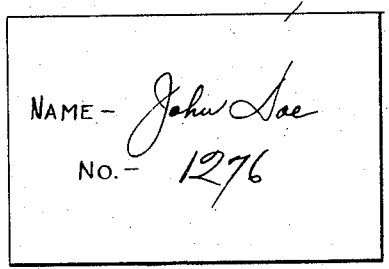
Fig. 5 is a conventional representation of an identification card.

It being understood that any suitable elements employed in plurality in the organism of the automobile may be utilized for the carrying out of my invention, the gear case shown and its appurtenances may be taken as one instance of the kind, the upper and lower sections of the gear case involving a plurality of similar bolts A and another group of bolts A'. One of the bolts having been selected as a medium, the same is formed with a pocket 10, here shown as in the shank of the bolt and extending axially from the front end thereof, said end having the usual nut 11 to coact with the bolt in clamping in this instance the gear case sections B. Said pocket is adapted to accommodate a holder 12, here shown as cylindrical which may contain a card 13 in rolled or folded form and bearing any identifying name, number, or symbol. The pocket with the container 12 therein is closed by a plug 14 which may, as shown, be a screw plug and in order that the removal of the plug may effect the withdrawal of the container 12 from the pocket, connection is established between the plug and the cap 15 of the container, there being interlocked eyes 16 employed for the connection in the example given. The screw plug 14 is shown formed with a kerf or slot 17 in the outer end thereof to receive a screw driver in the placing and removal of the plug. The slot 17 in practice when the plug is in position, is filled with cement, paint, or the like, as indicated at 18, Fig. 2, and the end of the bolt otherwise given a finish to have it not readily distinguishable from other bolts so that the bolt in its character as an identification means will not be apparent. Thus, in its character as a bolt it acts as a disguise for the identification means and the importance of the relation of the bolt to other similar bolts in the automobile will be obvious in the masking of the bolt in which the identification means is embodied. The preferred means as illustrated and described are with a view to the maximum value of the arrangement in preserving the identification means intact and the availability of the same as evidence.

In the use of the invention, in practice, it will be clear that an insurance company for example may incorporate in an automobile its own selected means of identification for that particular automobile or for all the automobiles of a given make. Thus, with a given number of automobiles, there will be a limited number of locations to be examined by the confidential agents and the precision with which the points of examination can be instantly located enables the agents to complete the examination of a large number of automobiles in a short period of time. It will be seen that the same means employed to expedite the work of the authorized parties works pronouncedly against unauthorized parties who, seeking to locate identification means, can feel safe only when every separate or removable part has been taken into account and even then only the complete renewal of such parts can insure a feeling of safety that all the identification means has been destroyed.

I would here mention that the invention serves to identify an automobile broken up and sold as junk.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. In a machine, identification means therefor embodied in and disguised by a part of the machine simulating other parts of said machine.

2. A machine having a plurality of similar elements, and identification means for said machine concealed by one of said elements.

3. A machine having a plurality of similar elements, and identification means for said machine embodied in one of said elements.

4. A machine identification means concealed within a bolt of the machine.

5. In a machine, instrumentalities entering into said machine as a part in the make-up thereof for the normal functions of the machine and similar to other parts of the machine, said instrumentalities embodying also concealed identification means for the machine and constituting a disguise therefor.

6. In a machine, means forming part of the machine looking to the normal functions of the latter and constituting also means to accommodate and conceal an identification means for said machine, said first means simulating other means forming part of the machine structure.

7. In a machine and identification means therefor, an element of said machine formed with a pocket, and a holder for an identification medium, said pocket accommodating said holder, and said element with the holder therein being given an appearance to simulate other parts of the machine for disguising its special character in functioning as a factor in the identification means.

8. In a machine, a bolt therein functioning as part of the machine structure, said bolt having a pocket adapted to receive identification means, and a closure for said pocket, the bolt and its closure presenting the normal appearance of an ordinary bolt.

9. A machine having a plurality of bolts therein, one of said bolts having an identification means concealed thereby and disguised by the resemblance of the bolt to other bolts in the machine.

10. In a machine, a bolt therein functioning as part of the machine structure and having a pocket adapted to removably accommodate identification means, means forming a closure of the pocket to conceal said identification means, and means constrained to move with said closure means for removing the identification means with the removal of the closure.

11. In a machine, a bolt therein and having a pocket adapted to removably accommodate identification means, a container accommodated in said pocket and adapted to hold identification means, and means forming a closure of the pocket and having connection with said container to constrain the latter to move outwardly with the removal of said closure means.

JOSEPH BILLINGS.